US006965511B2

United States Patent
Rudd et al.

(10) Patent No.: US 6,965,511 B2
(45) Date of Patent: Nov. 15, 2005

(54) SYSTEM AND METHOD FOR PERSONALIZING AN ELECTRICAL DEVICE

(75) Inventors: Michael L Rudd, Fort Collins, CO (US); Jerlyn R Culp, Fort Collins, CO (US); Michelle R. Lehmeier, Loveland, CO (US); Brian J. Brown, Fort Collins, CO (US); James C Albritton-McDonald, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/975,292

(22) Filed: Oct. 10, 2001

(65) Prior Publication Data

US 2003/0067738 A1 Apr. 10, 2003

(51) Int. Cl.[7] .................................................. G06F 1/16
(52) U.S. Cl. ....................... 361/680; 361/683; 200/5 A; 400/486; 379/447; 348/734
(58) Field of Search .................................. 361/680, 682, 361/683, 684, 686; 200/5 A, 5 R, 16 R, 16 A, 100, 18, 211, 510–517, 341–345; 400/486, 495, 472–474, 483–487, 499, 719; 379/447, 368, 110; 341/22, 23, 26, 30, 31, 36; 250/221, 229; 348/734

(56) References Cited

U.S. PATENT DOCUMENTS

| | | | |
|---|---|---|---|
| 3,707,611 A | * 12/1972 | Twyford | ...................... 200/211 |
| 4,292,515 A | * 9/1981 | Nelson | ...................... 250/229 |
| 4,647,911 A | 3/1987 | Maegawa et al. | |
| 4,906,117 A | * 3/1990 | Birdwell | ...................... 400/490 |
| 4,927,279 A | * 5/1990 | Morgan | ...................... 400/486 |
| 5,140,632 A | * 8/1992 | Anten | ...................... 379/447 |
| 5,253,940 A | * 10/1993 | Abecassis | ...................... 400/495 |
| 5,536,170 A | * 7/1996 | Murphy | ...................... 434/113 |
| 5,668,358 A | * 9/1997 | Wolf et al. | ................. 200/5 A |
| 5,729,222 A | * 3/1998 | Iggulden et al. | .............. 341/31 |
| 5,907,612 A | * 5/1999 | Aggus et al. | ............... 379/368 |
| 6,388,877 B1 | * 5/2002 | Canova et al. | .............. 361/686 |

FOREIGN PATENT DOCUMENTS

EP          0806714 A1    11/1997

* cited by examiner

*Primary Examiner*—Michael Datskovsky

(57) ABSTRACT

The present disclosure relates to a system and method for personalizing an electrical device. In one arrangement, the system comprises an electrical device having a plurality of button openings that are adapted to receive buttons that control operation of the electrical device, and a plurality of removable buttons that can be interchangeably disposed within the button openings of the electrical device, the buttons being provided with a variety of discrete features so as to be selectable by a user for provision on the electrical device in an arrangement chosen by the user to personalize the device as desired by the user. In one arrangement, the method comprises the steps of receiving selection of a particular device functionality to be associated with a particular encoded button, and assigning the selected device functionality to the encoded button such that when the encoded button is disposed within a button opening of the electrical device and depressed, the selected functionality will be performed by the electrical device.

10 Claims, 6 Drawing Sheets

SYSTEM AND METHOD FOR PERSONALIZING AN ELECTRICAL DEVICE

FIELD OF THE INVENTION

The present disclosure relates to a system and method for personalizing an electrical device. More particularly, the disclosure relates to a system and method with which a user interface and/or operation of an electrical device can be changed to suit one's own personal preferences or needs.

BACKGROUND OF THE INVENTION

Consumer product manufacturers have historically provided the customer with various options for the look and feel of consumer products to allow the customer to purchase a product which meets his or her own sense of style. Under such circumstances, the consumer product, although functioning in substantially the same way for all persons, can be personalized to some degree to suit the customer's tastes.

Recently, this type of personalization has begun to be offered to purchasers of computers and other electronic devices. By way of example, several mobile telephone manufacturers provide a variety of different colored faceplates that can be removably snapped onto the purchased mobile telephone so that the customer can personalize the look of his or her telephone. To cite another example, the iMac™ computer produced by Apple Computer, Inc. is available in various different colors which the user may choose.

Although permitting customers to personalize their devices to some degree, such personalization, where available, is minor. Therefore, each unit of a particular device (e.g., mobile telephone) is nearly identical to all others with the exception of a minor superficial difference such as the color. Accordingly, with the exception of minor aesthetic variation, such devices are capable of only limited personalization. This is unfortunate in view of the importance that device personalization can have to the customer. Specifically, many customers see such devices as an expression of their individuality and the availability of personalization can therefore significantly influence a purchasing decision.

In addition to providing only minor differences for the customer, mere cosmetic personalization such as that described above does nothing to personalize the operation of the device. Therefore, instead of being able to personalize the operation of the device to suit one's personal preferences or needs, the purchaser must conform to the static modes of operation chosen by the manufacturer for the device. This is unfortunate for the purchaser in that, were great personalization available, the ease of use of the device could be greatly improved.

SUMMARY OF THE INVENTION

From the foregoing, it can be appreciated that it would be desirable to have a system and method for personalizing an electrical device such that a greater and more meaningful degree of personalization can be obtained.

The present disclosure relates to a system and method for personalizing an electrical device.

In one arrangement, the system comprises an electrical device having a plurality of button openings that are adapted to receive buttons that control operation of the electrical device, and a plurality of removable buttons that can be interchangeably disposed within the button openings of the electrical device, the buttons being provided with a variety of discrete features so as to be selectable by a user for provision on the electrical device in an arrangement chosen by the user to personalize the device as desired by the user.

In one arrangement, the method comprises the steps of receiving selection of a particular device functionality to be associated with a particular encoded button, and assigning the selected device functionality to the encoded button such that when the encoded button is disposed within a button opening of the electrical device and depressed, the selected functionality will be performed by the electrical device.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

As noted above, typically only superficial personalization is currently available for electrical devices. Accordingly, presently contemplated are highly personalizable electrical devices with which the user can customize his or her user experience. As is discussed in greater detail below, this personalization can range from merely changing the aesthetics of the user interface to altering operation of the electrical device.

An example system for personalizing an electrical device will first be described with reference to the figures. Although this system is described in detail, it will be appreciated that this system is provided for purposes of illustration only and that various modifications are feasible without departing from the inventive concept. After the example system has been described, examples of operation of the system will be provided to explain the manners in which personalization can be achieved.

Figure 1:
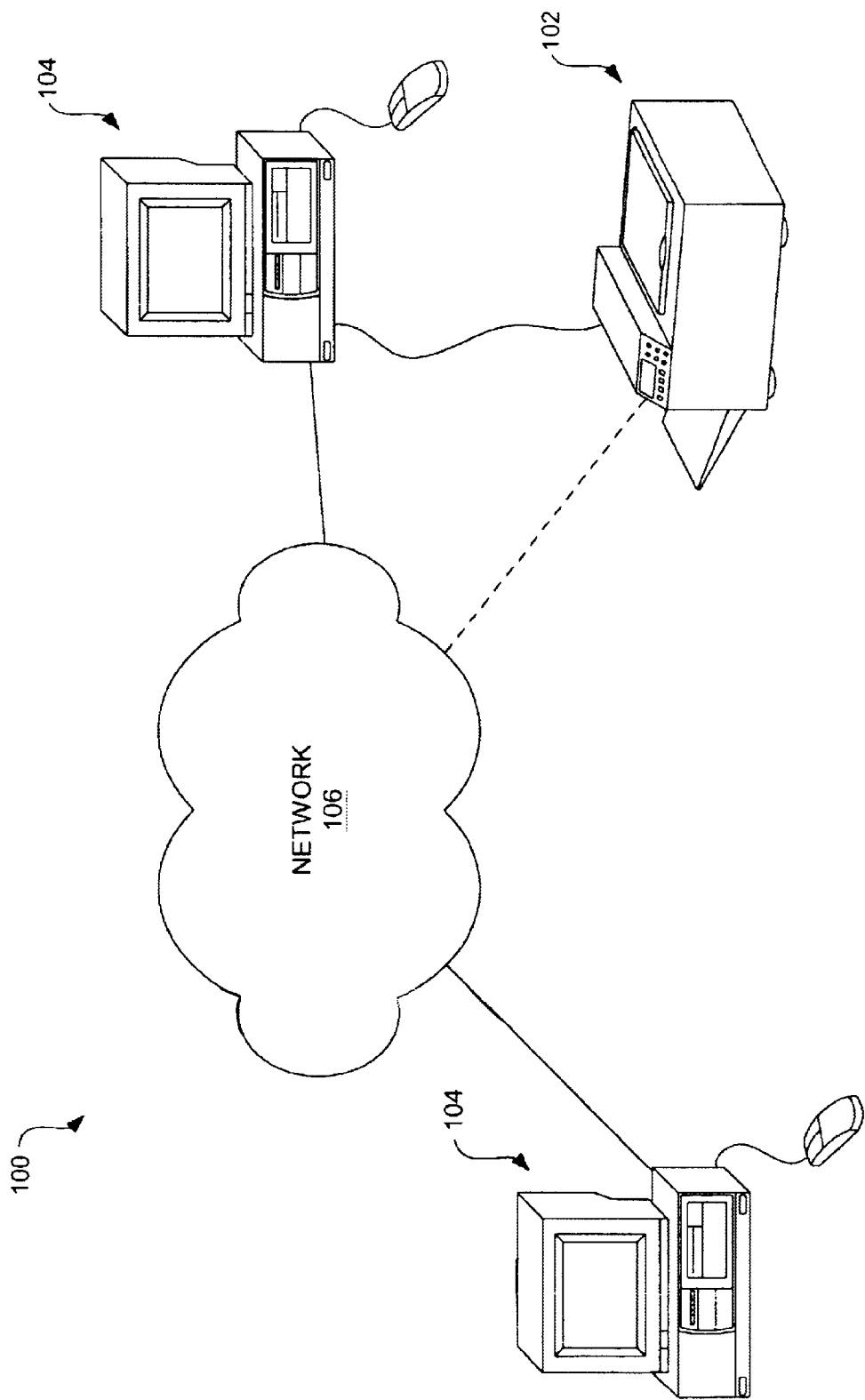
FIG. 1 is a schematic view of a system for personalizing an electrical device.

Referring now in more detail to the drawings, in which like numerals indicate corresponding parts throughout the several views, FIG. 1 illustrates a system 100 for personalizing an electrical device. As indicated in this figure, the system 100 generally comprises an electrical device 102. By way of example, this electrical device 102 can comprise an imaging device such as a photocopier, printer, scanner, digital camera, or multi-function peripheral (MFP) device, which can be capable of various different functionalities such as photocopying, printing, scanning, faxing, emailing, etc. However, as will become apparent to the reader from the description that follows, the electrical device 102 could comprise substantially any electrical device with which a user can interface including, but not limited to, an Internet appliance, personal digital assistant (PDA), mobile telephone, calculator etc.

In addition to the electrical device 102, the system 100 can include one or more computing devices 104. The computing devices 104 comprise substantially any device that is capable of use with the electrical device 102 and, more particularly, which is capable of communicating with the electrical device by transmitting data to and/or receiving data from the electrical device. By way of example, the computing devices 104 comprise personal computers (PCs). Although PCs are identified in FIG. 1 and discussed herein, it will be appreciated any one of the computing devices 104 could, alternatively, comprise another type of computing device. Moreover, it is to be understood that the electrical device could operate in a "stand alone" capacity, in which no connected computing device 104 is needed (e.g., facsimile functionality).

As is further identified in FIG. 1, the electrical device 102 and the computing devices 104 can, optionally, be connected to a network 106 that typically comprises one or more sub-networks that are communicatively coupled to each other. By way of example, these networks can include one or more local area networks (LANs) and/or wide area networks (WANs). Indeed, in some embodiments, the network 106 may comprise a set of networks that forms part of the Internet. As is depicted in FIG. 1, one or more of the computing devices 104 can be directly connected to the electrical device 102. Such an arrangement is likely in a home environment in which the user does not have a home network and instead directly communicates to the electrical device 102. In such a scenario, communication can be facilitated with a direct electrical and/or optical connection or through wireless communication.

Figure 2:
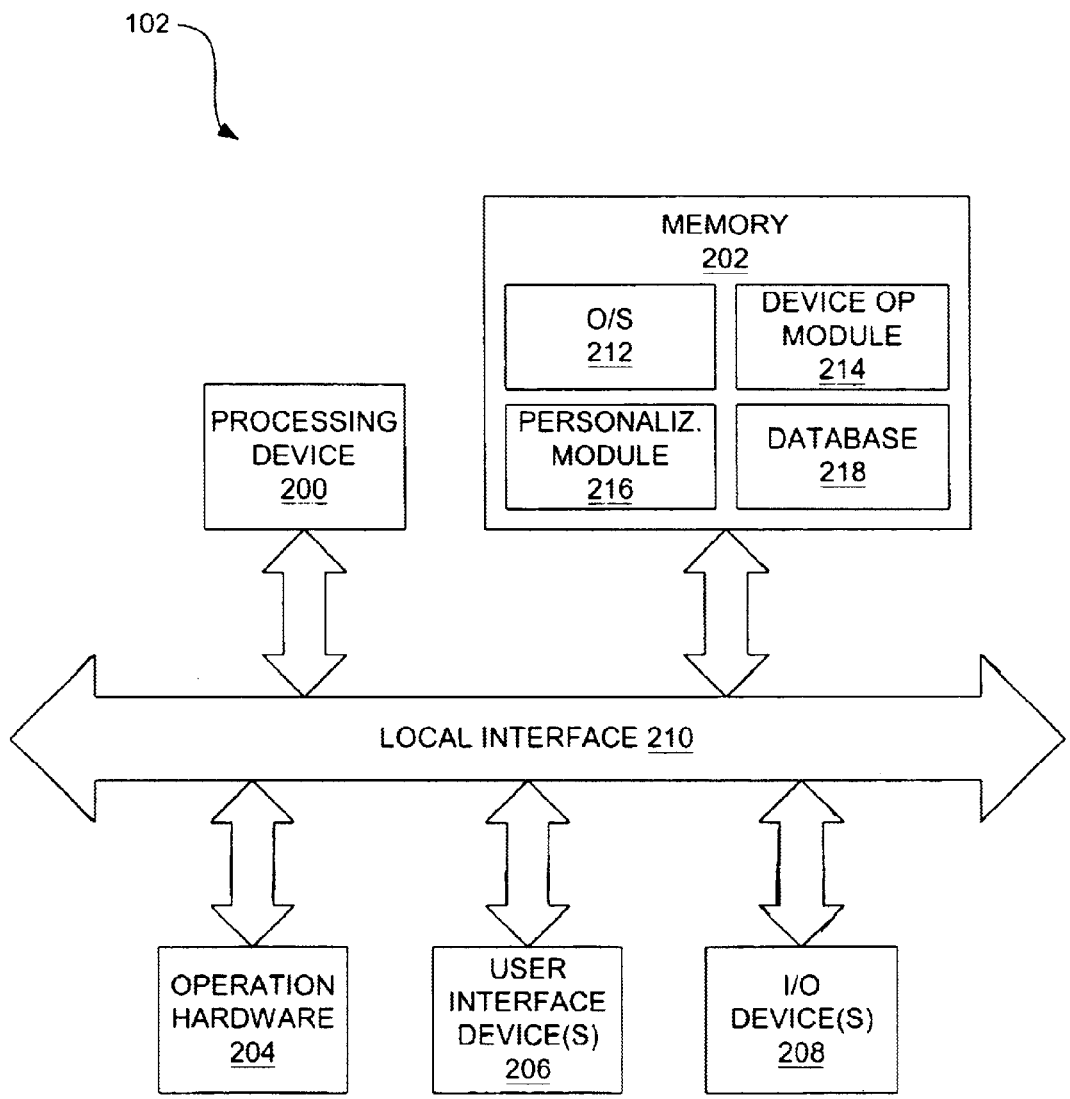
FIG. 2 is a schematic view of an electrical device shown in FIG. 1.

FIG. 2 is a schematic view illustrating an example architecture for the electrical device 102 shown in FIG. 1. As indicated in FIG. 2, the electrical device 102 can comprise a processing device 200, memory 202, device operation hardware 204, one or more user interface devices 206, and one or more input/output (I/O) devices 208. Each of these components is connected to a local interface 210 that, by way of example, comprises one or more internal buses. The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the electrical device 102.

The device operation hardware 204 comprises the components with which the electrical device 102 operates to satisfy its intended functionalities. As will be appreciated by persons having ordinary skill in the art, the nature of the device operation hardware 204 depends upon these functionalities. For example, where the electrical device 102 comprises a scanner, the device operation hardware 204 typically includes a light source (e.g., fluorescent light), focusing elements (e.g., lenses, mirrors, and displaceable carriage), and one or more light sensing devices (e.g., charge-coupled devices (CCDs)).

The one or more user interface devices 206 typically comprise interface tools with which the device settings can be changed and through which the user can communicate commands to the electrical device 102. By way of example, the user interface devices 206 comprise one or more function keys and/or buttons or separate keyboard with which the operation of the electrical device 102 can be controlled, and a display, such as a liquid crystal display (LCD), with which information can be visually communicated to the user and, where the display comprises a touch-sensitive screen, commands can be entered. Typically, the user interface, and in some cases the functioning of the electrical device 102, can be changed by the user to personalize the look, feel, and operation of the device. In some arrangements, this adjustability can be provided for removable and/or interchangeable buttons of the electrical device user interface.

Figure 3:
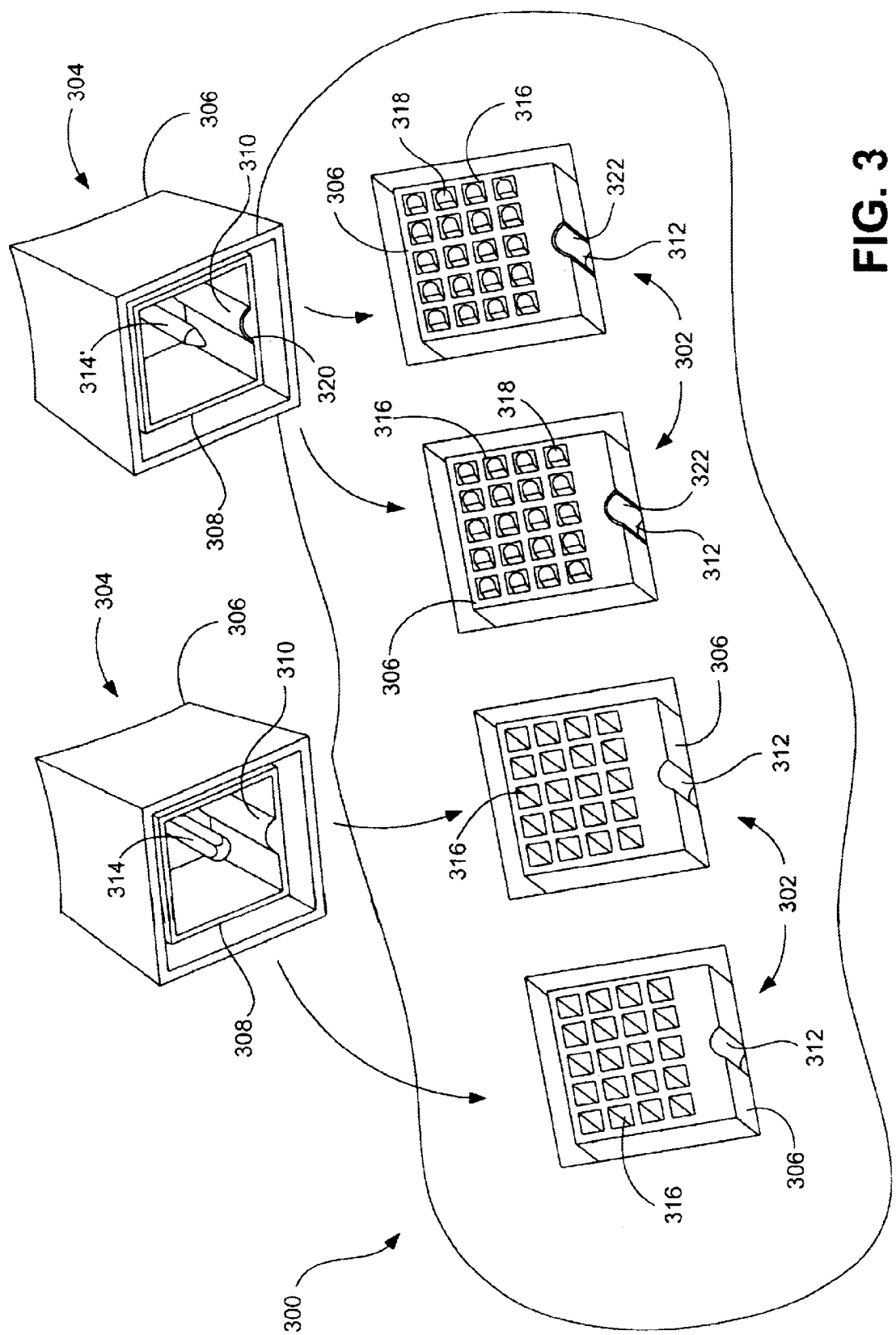
FIG. 3 is a schematic view of an example control panel for the electrical device shown in FIG. 2.

FIG. 3 illustrates an example control panel 300 of the electrical device 102 in which button removal and/or interchangeability is provided. As indicated in this figure, the control panel 300 comprises a plurality of button openings 302 that are adapted to receive removable buttons 304. Each button 304 can comprise a finger pad 306 which a user's finger contacts when the button is depressed and an inner mounting portion 308 that is used to mount the button to the control panel 300. Although both of these features are shown in FIG. 3 as having a generally rectangular cross-section, it is to be understood that the particular shape of these features could be alternatively arranged. For instance, the buttons 304 and/or button openings 302 could be circular or elliptical in cross-section, if desired. Indeed, as the following discussion elucidates, varied finger pad 306 shapes may be used to provide one manner of personalization of the electrical device 102.

Inside the button openings 302 are button receiving members 306 to which the buttons 304 can be connected so that, when the button is depressed, a predetermined command is communicated to the electrical device 102. In particular, the button receiving members 306 are configured to receive the mounting portions 308 of the buttons 304. To aid the user in mounting the button 304 on a particular button receiving member 306 in the correct orientation, the mounting portion 308 of the button can be provided with a key 310 and the receiving member 306 can be provided with a keyslot 312 adapted to receive the key. Where provided, the key 310 and keyslot 312 ensure that the button 304 can only be mounted in one orientation. Although the key 310 has been described as being provided on the button 302 and the keyslot 312 as being provide on the button receiving member 306, it will be appreciated by persons having ordinary skill in the art that the locations of the key and keyslot could be reversed, if desired, to achieve the same result. In addition, it will be understood that various other keyed configurations could be used to ensure the correct orientation of the buttons 304 in the button openings 302.

In some arrangements, the buttons 304 are encoded so as to be configured to communicate a particular functionality to the electrical device 102. In these arrangements, the button receiving members 306 can be provided with functionality sensing elements described below. The button encoding can either be mechanical or electrical in nature. For example, the button 304 can be mechanically encoded with one or more nonconductive pins 314 that extend outwardly from the inside of the button. When such a pin 314 is provided, the button receiving members 306 can include several pin openings 316 that are adapted for receipt of the pins. Arranged in this manner, a particular functionality of the button 304 can be communicated to the electrical device 102 by the location of the pin 314, i.e. by the pin opening 316 in which the pin 314 is disposed. The location of the pin 314 can be detected through various different methods. Typically, however, the pin 314 depresses an sensing member (not shown) within each of the pin openings 316 which can complete an internal electrical circuit such that the location of the pin can be determined by the device 102. Although a pin and pin opening arrangement is shown and described, it will be understood that alternative mechanical encoding is feasible and may even be preferable.

Electrical encoding can be alternatively or additionally provided. For instance, one or more of the buttons 304 can comprise an electrically conductive pin 314 that is adapted to contact a spring contact 318 disposed in each of the pin openings. To complete a circuit, the button 304 can be provided with a first conductor 320 that is adopted to mate with a second conductor 322 provided on the button receiving member 306. Although such an electrical encoding arrangement has been shown, persons having ordinary skill in the art will appreciate that manifold alternative arrangements are feasible.

With the control panel 300, the user has the option to change the buttons 304 of the electrical device 102 to suit his or her personal aesthetic tastes. In addition, as is discussed in greater detail below, the buttons 304 may be selected to generate interest in particular users (e.g., children) or to improve usability for particular users (e.g., visually impaired persons). Where the buttons 304 are encoded and the button receiving members 306 adapted to read this encoding, the user can further change the locations of particular buttons (e.g., send button) and can even change the various functionalities of the electrical device 102 in accordance with the particular buttons that the user chooses to provide on the device. Such personalization of the electrical device 102 through use of the buttons 304 is discussed in greater detail below.

Returning to FIG. 2, the one or more I/O devices 208 are adapted to facilitate connection to the network 110 and/or to another device, such as a computing device 104, and may therefore include one or more serial and/or parallel ports. Where the electrical device 102 is adapted for communications over the network, the I/O devices can further include one or more communication devices such as a modem.

The memory 202 includes various software (e.g., firmware) programs including an operating system 212, device operation module 214, and a personalization module 216. The operating system 212 contains the various commands used to control the general operation of the electrical device 102. The device operation module 214 comprises commands that control the operation of the basic device operation hardware 204 so that the device can execute its intended, basic functionalities (e.g. copying, scanning, faxing, etc.). The personalization module 216 comprises commands (firmware) that enable personalization of the operation of the electrical device 102 in relation to the user interface devices 206. Accordingly, the personalization module 216 is configured to permit customization of the user interface so that the use of the electrical device 102 can be personalized to suit the user. The operation of the personalization module 216 is described in greater detail below. In addition, the memory 202 can include a database 218 that is used to store various personalization information.

Figure 4:
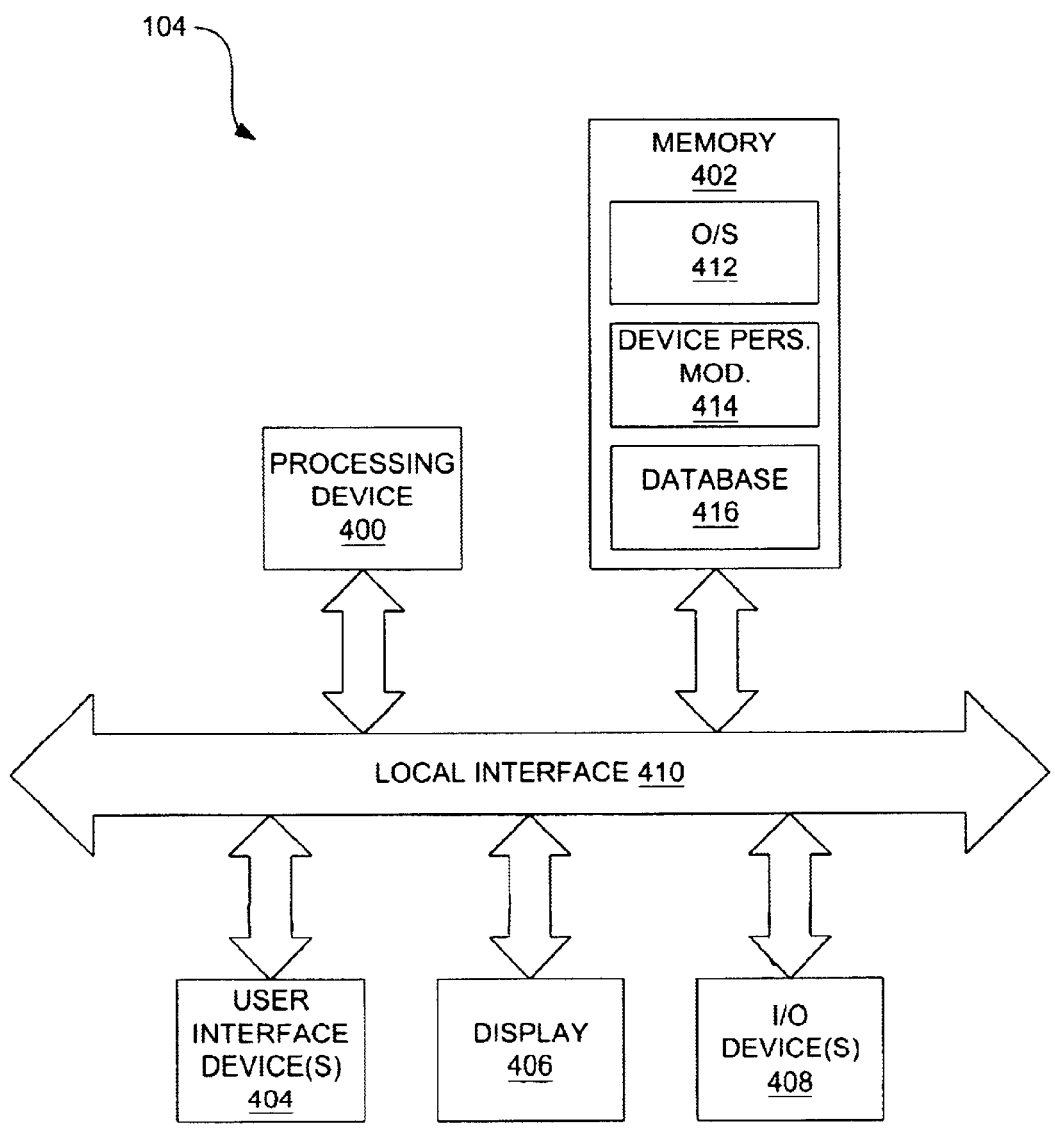
FIG. 4 is a schematic view of a computing device shown in FIG. 1.

FIG. 4 is a schematic view illustrating an example architecture for the computing devices 104 shown in FIG. 1. As indicated in FIG. 4, each computing device 104 can comprise a processing device 400, memory 402, one or more user interface devices 404, a display 406, and one or more I/O devices 408, each of which are connected to a local interface 410. The processing device 400 can include any custom made or commercially available processor, a central processing unit (CPU) or an auxiliary processor among several processors associated with the computing device 104, a semiconductor based microprocessor (in the form of a microchip), or a macroprocessor. The memory 402 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 404 comprise those components with which the user can interact with the computing device 104. By way of example, these components comprise those typically used in conjunction with a PC such as a keyboard and mouse. Similarly, the display 406 can comprise a display typically used in conjunction with a PC such as a computer monitor. The one or more I/O devices 408, like I/O devices 210, comprise components that facilitate connection to the network 110 and/or direct connection to another device, such as the electrical device 102.

The memory 402 normally comprises an operating system 412 and a device personalization module 414. The operating system 412 controls the execution of other software and provides scheduling, input-output control, file and data management, memory management, and communication control and related services. The device personalization module 414 comprises software that is used to remotely control the personalization of the electrical device 102. Operation of the device personalization module 414 is described in detail below with reference to FIG. 5. In addition, the memory 402 can include a database 416 that, like database 218, can be used to store various personalization information.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

In a first manner of personalization, the user can change the buttons 304 provided on the electrical device 102 for aesthetic purposes. For example, the user can select buttons 304 that have different colors, icons, textures, shapes, tactile qualities, etc. Such removable buttons 304 could be provided along with the electrical device 102 upon purchase, or could be made available to the user as independent items that can be purchased separately from the device. In addition, the buttons 304 could be sold in sets of buttons directed to certain types of use. For example, where the user foresees the electrical device 102 being used by children, a children's set of buttons 304 may be purchased. Such a set could include various styles of buttons 304 which children might enjoy. By way of example, the buttons 304 could have vibrant colors, fanciful shapes, fanciful icons (e.g., spider web to indicate the World Wide Web) provided on the finger pads, unusual (e.g., squishy) tactile properties, etc.

In addition to mere aesthetic appeal, the button sets can be adapted to increase ease of use of the computing device 102. For instance, where the user is visually impaired, the visual icons normally found on or around device buttons 304 are of little use. If, however, a set of Braille-coded buttons 304 were made available, visually impaired persons could then use the electrical device 102 without the aid of another person.

Other manners of personalization are feasible with the above-described system 100. For example, in addition to choosing the look and feel of the user interface buttons 304, the user can further modify the placement of the buttons. If, for instance, the electrical device 102 is a scanner, the device may include a "scan" button, a "print" button, a "fax" button, an "email" button, an "archive" button, etc. each initially located in a particular position on the control panel 300 of the electrical device. Where each of these buttons 304 is removable and encoded, the user could rearrange the location of the buttons to suit his or her personal tastes. Therefore, the user could, for example, place the most frequently used buttons 304 nearest the user's computing device 104 to make it easier to control the operation of the electrical device 102. Such rearrangement of the buttons 304 is detected by the personalization module 216 through the functionality sensing elements and appropriate adjustments made in accordance with the user's selections. In addition, particular sounds (e.g., audible descriptions of the associated functions) could be associated with the encoded buttons 304 and be emitted when the buttons are depressed.

The user could further change the available functionalities, and therefore operation, of the electrical device 102 through button 304 selection. In particular, the electrical device 102 can be sold with a plurality of different buttons 304, each having a different functionality associated with it which the device is capable of performing. Notably, where new buttons, and therefore new functionalities, are purchased after manufacture of the device 102, the device could, optionally, determine these functionalities by accessing a remote database via the network 106. Moreover, new software (e.g., firmware) could be downloaded where the device 102 is not presently configured for the functionality associated with the button 304. In such an arrangement, the user could select the various buttons 304 that would provide the various functionalities the user desires from the electrical device 102. This manner of personalization further permits the user to control use of the device 102. For example, if the electrical device 102 includes a scanner and the user is a parent that does not wish his or her children to fax images with the device, the user could simply remove a facsimile button from the electrical device, thereby disabling the fax functionality.

Figure 5:
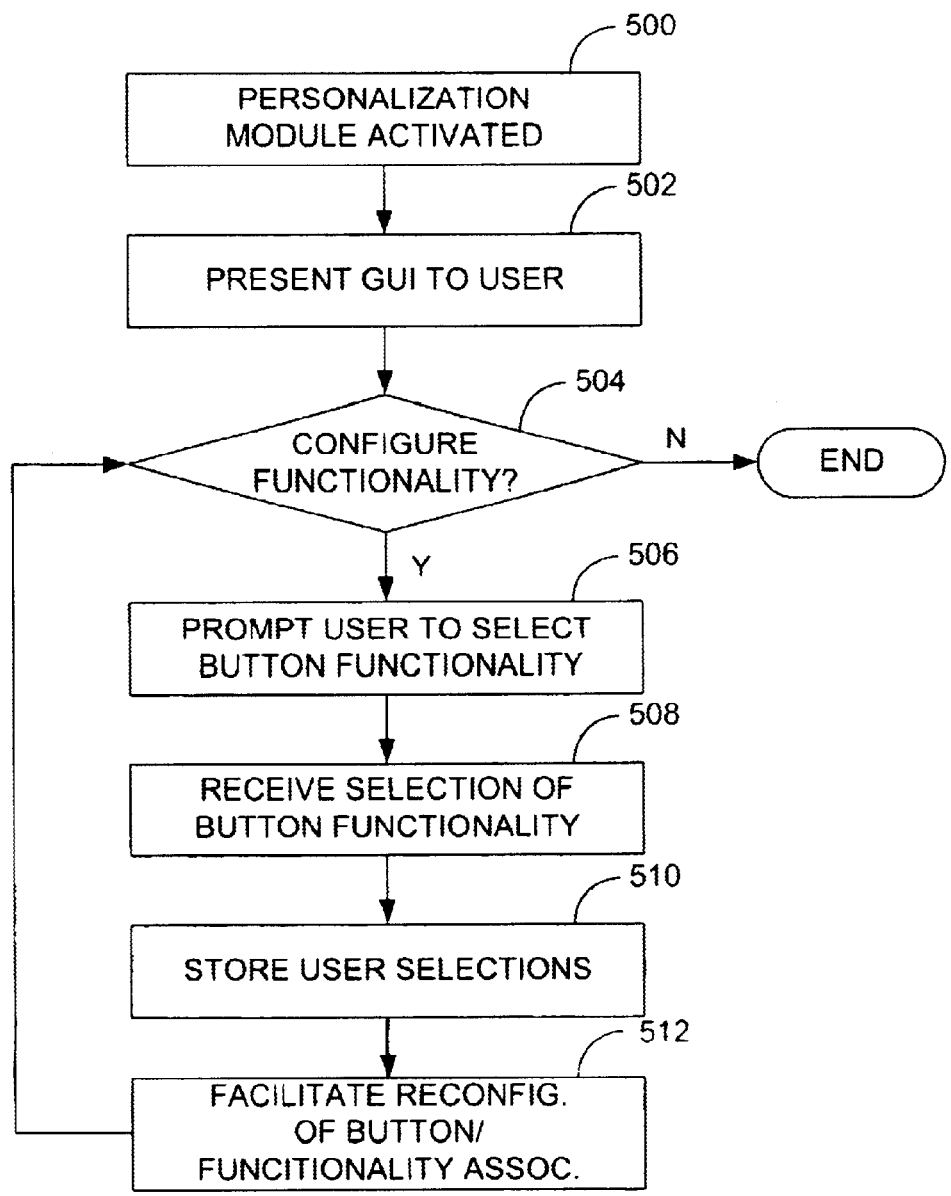
FIG. 5 is a flow diagram that illustrates an example of operation of personalization modules of the electrical device shown in FIG. 2 and the computing device shown in FIG. 4.

Operation of the user electrical device 102 can also be controlled by directly accessing the personalization module 216 of the electrical device 102, or the device personalization module 414 of the computing device 104. In particular, the electrical device 102 can be programmed with the personalization modules 216, 414 so that particular buttons are assigned particular, desired functionalities. FIG. 5 provides an example of operation of the personalization modules 216, 414 in providing this manner of personalization. As indicated in block 500, the personalization module 216, 414 is first activated. The nature of this activation depends upon which personalization module 216, 414 is being accessed. For instance, where the module comprises the personalization module 216 of the electrical device 102, activation may occur in response to selection of a "configure" button provided in the control panel 300 of the device. Where the module comprises the personalization module 414 of the computing device 104, activation may occur in response to initiation of a device personalization application that can be run by the computing device.

In any case, once the personalization module 216, 414 has been activated, a graphical user interface (GUI) can be presented to the user, as indicated in block 502, which presents various options to the user. For example, one of these options can be used to configure the assigned functionality of the available device buttons 304. Where this option is provided, it can then be determined whether the user would like to configure the assigned functionalities, as indicated in decision element 504. If not, flow for button configuration is terminated. If the user would like to configure the button functionalities, however, flow continues to block 506 at which the personalization module 216, 414 prompts the user to select button functionality. The user can be prompted for this information in a variety of ways. By way of example, the user can be presented with two lists, one containing all available buttons 304 (e.g., numbered 1-n) and the other containing all functionalities for which the electrical device 102 is configured. Where the electrical device 102 comprises a scanner, these functionalities may include, for example, scan, copy, print, scan to a facsimile application, scan to a word processing application, scan to an image editor, scan to a website, etc.

The personalization module 216, 414 can then receive the user's selections, as indicated in block 508. By way of example, these selections can be registered by matching particular buttons 304 identified in the button list with particular functionalities identified in the functionalities list. At this point, the personalization module 216, 414 stores the selections (e.g., in database 218, 416), as indicated in block 510, and facilitates reconfiguration of the button/functionality association of the electrical device 102, as indicated in block 512. Where personalization module 414 is being used, this facilitation can comprise transmission of the various selections to the personalization module 216 of the electrical device 102. Where, on the other hand, the personalization module 216 is being accessed directly at the device 102, this facilitation typically comprises storage of the new association in the database 218. At this point, flow can return to decision element 504.

Figure 6:
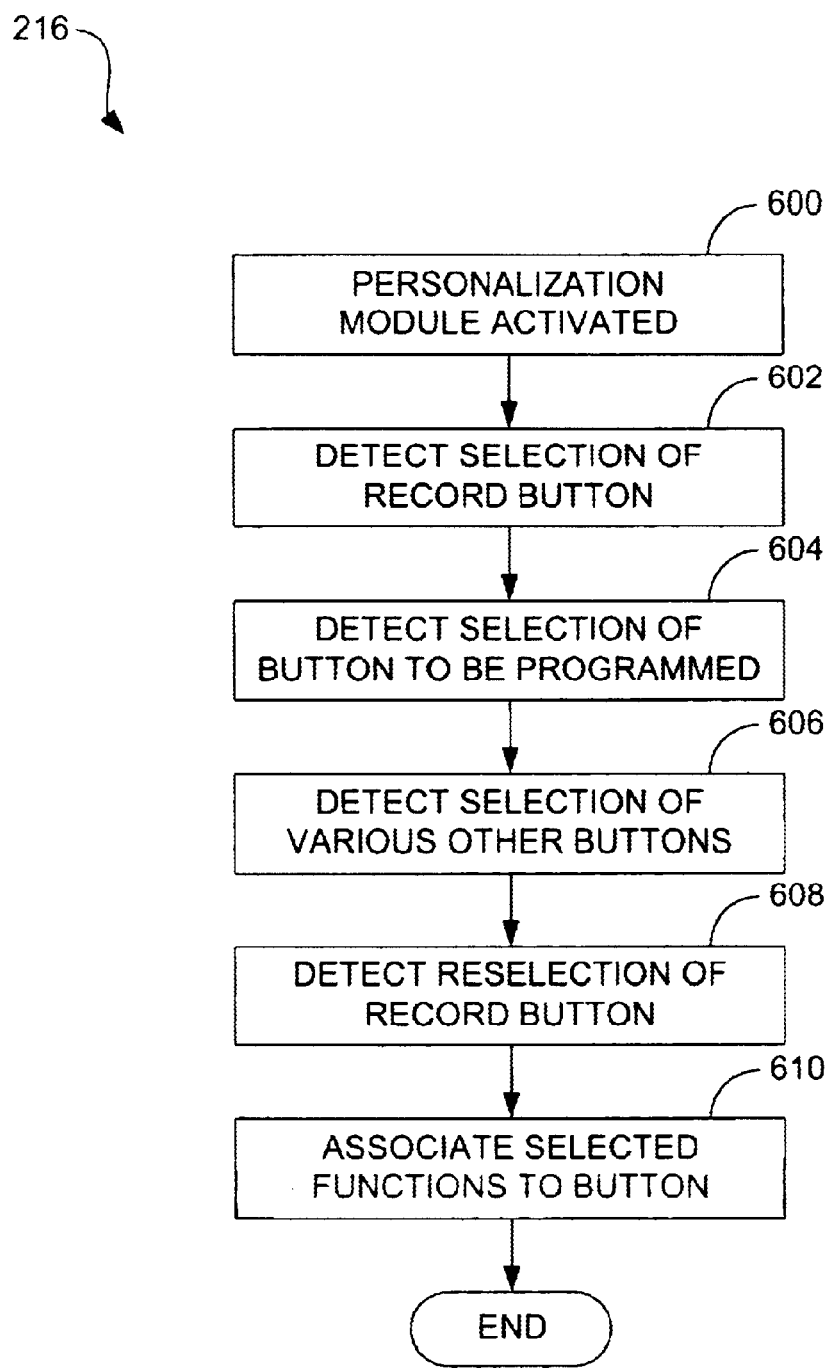
FIG. 6 is a flow diagram that illustrates a further example of operation of the personalization module of the electrical device shown in FIG. 2.

The functionality of the buttons 304 can be changed in other ways. For example, the electrical device 102 can be operated in a learning mode in which the user can program a particular button to be associated with one or more device functionalities. An example of operation in the learning mode for the personalization module 216 is illustrated in FIG. 6. As identified in block 600, the personalization module 216 is activated in the manner described above in relation to FIG. 5. Once activated, the personalization module 216 can be placed in the learning mode by, for example, detecting the selection of a "record" button provided on the device control panel 300, as indicated in block 602. Once placed in the learning mode, the personalization module 216 can be configured to, for example, receive an identification of which button 304 is going to be programmed and then "record" each button selected after the button to be programmed has been selected. In this manner, the personalization module 216 can associate two or more different functions with one selected button.

With continued reference to FIG. 6, the personalization module 216 can detect selection of the button to be programmed, as indicated in block 604. Although this button can be selected, it is to be understood that a particular button 304 of the control panel 300 can be set aside specifically for programming in this manner. Next, the personalization module 216 can detect the selection of various other buttons, as indicated in block 606. This selection reflects the functionalities the user wishes to associate with the button 304 to be programmed. Once the user has finished selecting buttons (and therefore functionalities), the personalization module 216 can then detect reselection of the record button, as indicated in block 608, as an indication that the all desired selections of functionalities have been made. At this point, the personalization module 216 can associate the various functionalities with the button 304 to be programmed, as indicated in block 610, such that, the next time that programmed button is selected, the various programmed functionalities will be performed by the device 102. By way of example, if the user programmed a button 304 by selecting the "scan," "email," and "archive" buttons, the device 102 will automatically scan a document or image, automatically transmit the scanned data to the user's email program residing on the user's computing device 104, and automatically archive the image when the programmed button is selected. Where the user has identified a default email address and has enabled automatic emailing, transmission to the email application can result in the automatic emailing of the scanned data to a default recipient.

In addition to changing the functionalities associated with the buttons 304, the user can also associate various sounds with the buttons such that a selected sound is emitted when the button is depressed. Such a feature can both make use of the electrical device more appealing to some users (e.g., children) and improve the ease of use for others (e.g., visually and/or hearing impaired persons). Typically, such associations can be made by the user in similar manner to the association of particular functionalities with the buttons 304 described above in relation to FIG. 5. Accordingly, the user may select from a list of available sounds to correlate with various buttons 304. In some embodiments, the electrical device 102 can further be adapted to receive the user's recorded sounds such that those sounds are added to the list of sounds from which to choose. Operating in this manner, the electrical device 102 can be personalized to the extent that the device operation is unique from all other such devices. Again, such operation can be facilitated by the personalization module 216, 414, which is responsible for creating the various button associations.

Variations and modifications of the invention are feasible. For example, the personalization described herein can be provided on a user-by-user basis. In such an arrangement, the electrical device 102 is configured to recognize the particular user e.g., through user log in with the computing device 104 or by selection of a user designation button provided on the device 102, and to adjust operation of the device in accordance with that user's selections.

What is claimed is:

1. An electrical device, comprising:
a plurality of button openings, each button opening including a button receiver member that is adapted to receive buttons that can be used to control operation of the electrical device, each button receiver member including a plurality of openings each adapted to receive a button pin and each including a sensing member that is configured to detect the presence of a pin; and
a removable button, the button including at least one pin that is adapted to be received in an opening of a button receiver, the position of the pin being selected such that it aligns with a particular button receiver member opening when the button is placed in a button opening such that the button is encoded to identify a particular functionality to the electrical device when disposed within a button opening of the device such that the buttons can be used to initiate a particular functionality irrespective of the button opening in which it is disposed.

2. The electrical device of claim 1, wherein the buttons are mechanically encoded.

3. The electrical device of claim 1, wherein the buttons are electrically encoded.

4. The electrical device of claim 1, wherein the buttons are provided with discrete features so as to be selectable by a user for provision on the electrical device in an arrangement chosen by the user to personalize the device as desired by the user.

5. The electrical device of claim 1, wherein the functionalities pertain to emitting particular sounds when the buttons are depressed.

6. An imaging device, comprising:
a plurality of button openings adapted to receive buttons that can be used to control operation of the imaging device; and
functionality sensing elements provided in the button openings that are adapted to determine a particular functionality that is associated with encoded, removable buttons that can be disposed within the button openings and that do not include an internal switch.

7. The imaging device of claim 6, wherein the functionality sensing elements comprise pin openings adapted to receive pins of the removable buttons.

8. A removable button adapted for interchangeable use with an electrical device, the button being encoded so as to be assigned a particular functionality such that when the button is disposed within a button opening of the electrical device, the electrical device can determine the assigned functionality and will be configured to initiate the functionality when the button is depressed wherein the button does not include a switch.

9. The electrical device of claim 8, wherein the buttons are mechanically encoded.

10. The electrical device of claim 8, wherein the buttons are electrically encoded.

* * * * *

UNITED STATES PATENT AND TRADEMARK OFFICE
CERTIFICATE OF CORRECTION

PATENT NO. : 6,965,511 B2  Page 1 of 1
APPLICATION NO. : 09/975292
DATED : November 15, 2005
INVENTOR(S) : Michael L. Rudd et al.

It is certified that error appears in the above-identified patent and that said Letters Patent is hereby corrected as shown below:

On the Title Pg, Item - 56 -, under "U.S. Patent Documents",
line 1, below "3,707,611 A  *  12/1972  Twyford ......... 200/211"
insert -- 4,037,092  07/1977      Osborne, et al.
            4,200,913  04/1980      Kuhar, et al. --.

On the Title Pg, Item - 56 -, under "U.S. Patent Documents",
line 1, above "4,292,515 A  *  9/1981  Nelson ............ 250/229"
insert -- 4,132,877  *  1/1979  Daigle ................... 200/296
            4,417,115  *  11/1983  Desmarais et al. ..... 200/517
            3,934,104  *  1/1976  Stout ................... 200/532 --.

On the Title Pg, Item - 56 -, under "Foreign Patent Documents",
line 1, below "EP   0806714 A1  11/1997" insert -- DE   3,805,593 A1  9/1988 --.

On the Title Pg, Item - 56 -, under "Foreign Patent Documents",
line 1, below "EP   0806714 A1  11/1997" insert -- GB   2237426 A --.

On the Title Pg, Item - 56 -, below "EP   0806714 A1  11/1997" insert
-- OTHER PUBLICATIONS
German Office Action dated May 21, 2004 --.

In Column 5, line 11, delete "314" and insert -- 314' --, therefor.

Signed and Sealed this

Nineteenth Day of May, 2009

JOHN DOLL
*Acting Director of the United States Patent and Trademark Office*